A. J. SUTHERLAND.
Machines for Shaping Pickets.
No. 145,766.                              Patented Dec. 23, 1873.
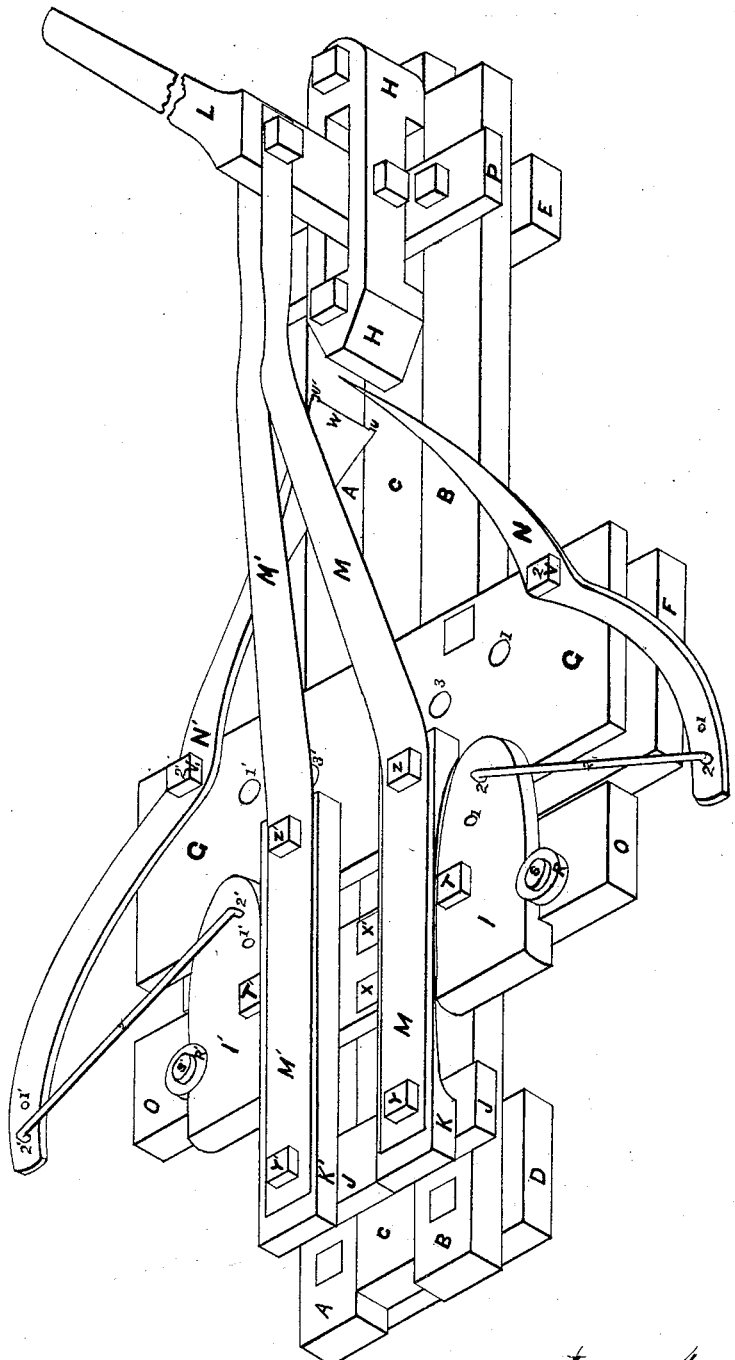
Witnesses:
O. E. Haven
Chas. Tripp
Inventor:
Andrew J. Sutherland

UNITED STATES PATENT OFFICE.

ANDREW J. SUTHERLAND, OF ANN ARBOR, MICHIGAN.

IMPROVEMENT IN MACHINES FOR SHAPING PICKETS.

Specification forming part of Letters Patent No. 145,766, dated December 23, 1873; application filed August 8, 1873.

*To all whom it may concern:*

Be it known that I, ANDREW J. SUTHERLAND, of Ann Arbor, in the county of Washtenaw and State of Michigan, have invented a Machine for Shaping Pickets or other Articles, of which the following is a specification:

This machine may be described as follows: Two prismatic pieces, A and B, are rigidly fastened to cross-pieces D, F, G, E, and P, as shown in the drawing. Between A and B is a similar piece, C, of the same thickness as A and B, and moving between them. To C is bolted a head-block, H, cut out on its under side so as to pass freely over the cross-piece P. H is fitted to receive a lever, L, on its upper side. The cross-piece O is bolted to C by the bolts $x$ and $x'$. O carries the blocks I and I', fastened to it by the bolts T and T', and kept from turning about them by being fitted around the friction-wheels R and R'. I and I' have certain holes, 1 and 1', 2 and 2', made in them. The cross-piece G has fastened to it the knives N and N' by the bolts V and V', about which they can turn. These knives or cutters have at one end, at W, a cutting-edge formed between two projections, $u$ and $u'$, so placed as to prevent the edges from being injured by contact in working the machine. At the other end of N and N' are holes 1 and 1', 2 and 2', numbered to correspond with holes in the pieces I and I', in connection with which they are used. These holes are connected by arms bearing the same number. Also, in the cross-piece G are placed holes with similar numbers, sufficiently large to receive the bolts V and V'. All holes and arms of the same number are used simultaneously. A fulcrum for the lever L is obtained by connecting it, by means of ties M and M' and bolts Y and Y', Z and Z', to the fixed part of the machine, as shown. Under these ties, and held in place by the same bolts, are the guides K and K', resting upon the cross-pieces G and J, so as to allow the cross-piece O to pass freely under them. The guides K and K' are adjustable by means of slotted holes, through which the bolts pass.

The following is the operation to shape a picket:

DEFINITIONS.—Call the end at which the guides K and K' are the guide end. Call the other end the lever end.

Push the hand end of the lever the proper distance (to be defined hereafter) toward the guide end. Place a picket between the adjusted guides K and K'. Shove it in contact with H. Push the handle of the lever away from the guide end of the machine. This will move H toward the guide end and carry the picket with it. At the same time the cross-piece O must move in the same direction, carrying with it I and I', and moving the ends of the arms attached to I and I' also in the same direction, thus turning the cutters N and N' about V and V', and bringing their edges nearer and nearer together, as the motion continues, until they meet, thus cutting from the moving picket the requisite chips to leave it in the required shape. It will now be seen that the head-block H must start the picket at a proper point for each required shape, in order that the cutters shall just come together at the end of the lever-stroke, and not waste any material or endanger the perfection of the required shape. This is regulated by a wedge placed between the cross-piece P and the shoulder of the head-block H toward the knives. This wedge is so placed that when the machine is set to receive a new picket the lever cannot be pushed too far toward the guide end.

By changing the bolts V and V' and the cutters N and N' to the holes 1 and 1' and using other arms, a new shape is obtained.

Remove the blocks I and I'. Place on the bolts T and T' friction-wheels similar to R and R'. Place N and N' so that V and V' will be in 3 and 3', and the ends of N and N' between the friction-wheels, before put in place, so as to run between and be guided by them. Now operate the machine, and a new shape is obtained.

In a similar manner the shapes obtained may be widely varied.

The driving force may be applied at either end of the machine, or, indeed, at almost any point.

I claim as my invention—

1. A picket-shaping machine provided with adjusting devices I I', holes 1, 2, &c., arms 1, 2, &c., cutters N N', bolts V V', and holes 1, 2, &c., in the block G, whereby the shaving-knives may be made to vary their style of approach while the picket is steadily moved between them, substantially as and for the purpose set forth.

2. In a picket-shaper, the knives W, provided with the protectors u u', substantially as and for the purpose set forth.

3. The pivoted cutters N N', in combination with the cross-pieces G F, connecting-bars 2, moving cross-piece O, head-block bar C, head-block H, and lever L, substantially as and for the purposes shown and described.

4. In a picket-shaper, the combination of the head-block H, lever L, and the spring-fulcrum M M', substantially as shown and described.

5. The combination of the lever L, spring-fulcrum M M', head-block H, bar C, cross-piece O, connections 2, and pivoted cutters N N' with a suitable frame or bed, substantially as and for the purpose set forth.

ANDREW J. SUTHERLAND.

Witnesses:
O. E. HAVEN,
CHAS. TRIPP.